US009219318B2

(12) United States Patent
Portas et al.

(10) Patent No.: US 9,219,318 B2
(45) Date of Patent: Dec. 22, 2015

(54) JOINTING ASSEMBLIES FOR ELECTRICAL CABLES

(75) Inventors: Francesco Portas, Milan (IT); Tania Collina, Milan (IT); Javier Gracia Alonso, Milan (IT)

(73) Assignee: PRYSMIAN S.P.A., Milan (IT)

( * ) Notice: Subject to any disclaimer, the term of this patent is extended or adjusted under 35 U.S.C. 154(b) by 203 days.

(21) Appl. No.: 13/992,904

(22) PCT Filed: Dec. 22, 2010

(86) PCT No.: PCT/EP2010/007851
§ 371 (c)(1),
(2), (4) Date: Sep. 9, 2013

(87) PCT Pub. No.: WO2012/083984
PCT Pub. Date: Jun. 28, 2012

(65) Prior Publication Data
US 2013/0341087 A1  Dec. 26, 2013

(51) Int. Cl.
| | |
|---|---|
| H01R 4/60 | (2006.01) |
| H01R 4/10 | (2006.01) |
| H02G 15/18 | (2006.01) |
| H01R 4/72 | (2006.01) |

(52) U.S. Cl.
CPC .. H01R 4/10 (2013.01); H01R 4/72 (2013.01); H02G 15/1826 (2013.01)

(58) Field of Classification Search
CPC ............ H02G 15/1806; H02G 15/182; H02G 15/1826
USPC .......................................... 174/73.1, 93, 88 R
See application file for complete search history.

(56) References Cited

U.S. PATENT DOCUMENTS

| | | | |
|---|---|---|---|
| 5,230,640 A | 7/1993 | Tardif | |
| 5,316,492 A | 5/1994 | Schaareman | |
| 5,365,020 A * | 11/1994 | Vallauri et al. | 174/73.1 |

(Continued)

FOREIGN PATENT DOCUMENTS

| | | |
|---|---|---|
| CN | 101438461 A | 5/2009 |
| EP | 0 435 569 A1 | 7/1991 |

(Continued)

OTHER PUBLICATIONS

International Search Report PCT/ISA/210 for PCT/EP2010/007851 dated Sep. 26, 2011.

(Continued)

*Primary Examiner* — Chau N Nguyen
(74) *Attorney, Agent, or Firm* — Harness, Dickey & Pierce, PLC

(57) ABSTRACT

A jointing assembly for electrical cables may include: a connector extending about a longitudinal axis and provided, at at least one end portion thereof, with at least one housing seat for at least one free end of a respective electrical cable; and a shrinkable sleeve coaxially arranged in a radially outer position with respect to the connector. The shrinkable sleeve may be held in a radially expanded state by at least one removable support element radially interposed between the connector and the shrinkable sleeve. The connector may be mechanically coupled to the at least one removable support element by at least one stop element that radially projects from at least one of the connector and the at least one removable support element, and that contacts the other one of the connector and the at least one removable support element.

18 Claims, 9 Drawing Sheets

(56) References Cited

U.S. PATENT DOCUMENTS

| | | | | |
|---|---|---|---|---|
| 5,753,861 | A | * | 5/1998 | Hansen et al. .................. 174/93 |
| 7,863,521 | B2 | * | 1/2011 | Campbell et al. ............... 174/93 |
| 2008/0257259 | A1 | * | 10/2008 | Vallauri et al. ................ 118/500 |
| 2009/0181583 | A1 | | 7/2009 | Krabs |

FOREIGN PATENT DOCUMENTS

| | | |
|---|---|---|
| EP | 0 504 035 A2 | 9/1992 |
| EP | 1 263 107 A1 | 12/2002 |
| EP | 1 852 949 A1 | 11/2007 |
| JP | H117999 B2 | 1/1999 |
| RU | 2258287 C2 | 2/2005 |
| WO | WO-2007/130811 A2 | 11/2007 |

OTHER PUBLICATIONS

Mar. 5, 2015, Russian Decision on Granting issued in corresponding Russian Application No. 2013133920/07(050740), with English-language translation.

Sep. 9, 2015, Chinese Office Action issued in corresponding Chinese Application No. 201080070827.X, with English translation.

\* cited by examiner

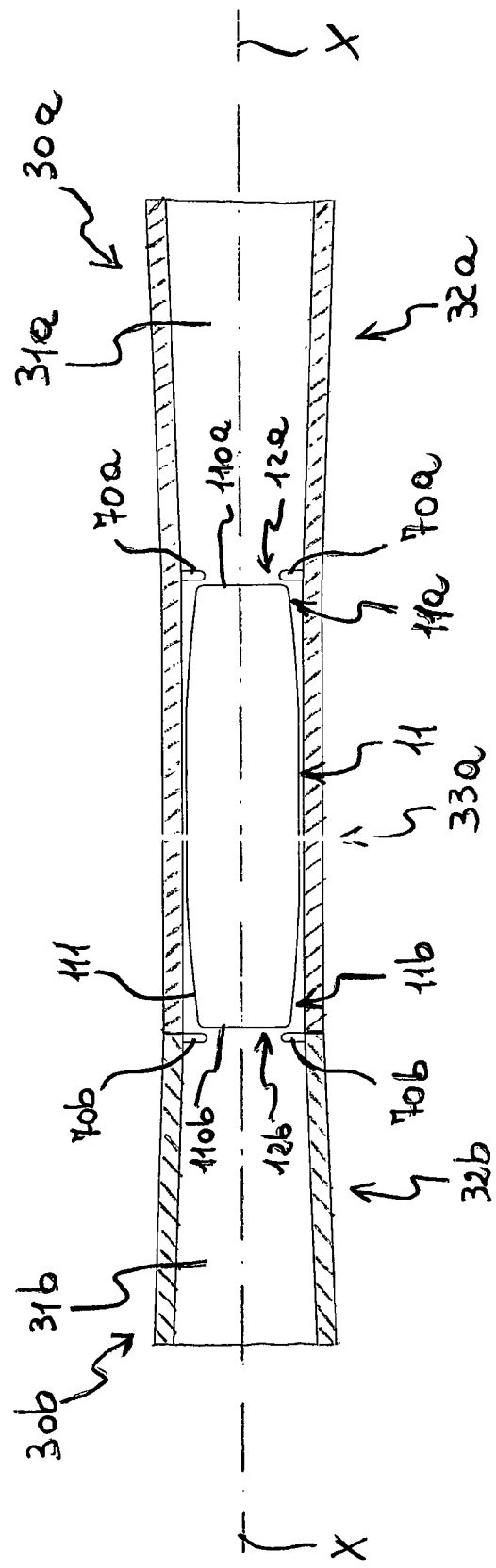

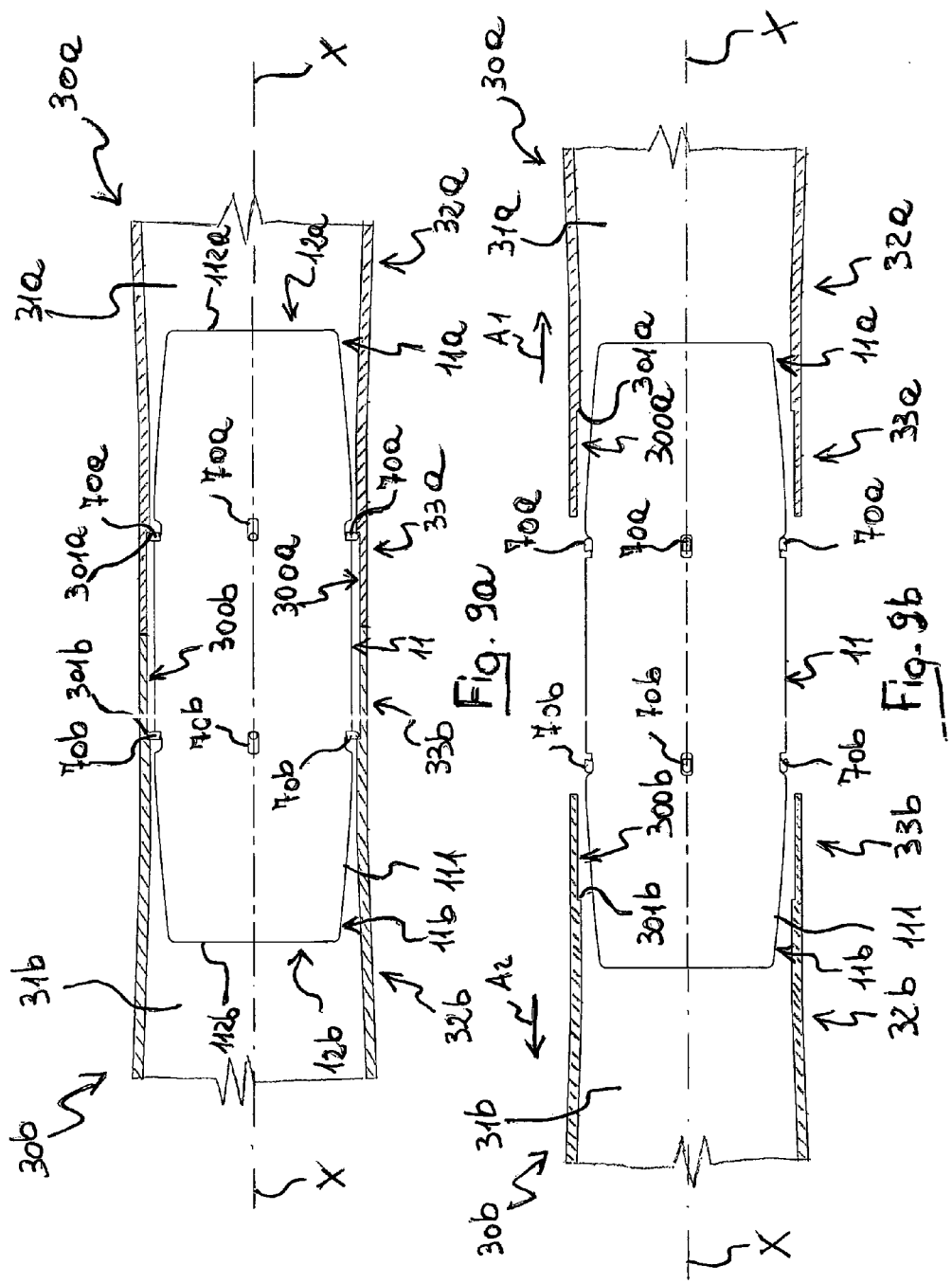

JOINTING ASSEMBLIES FOR ELECTRICAL CABLES

CROSS-REFERENCE TO RELATED APPLICATION(S)

This application is a national stage entry from International Application No. PCT/EP2010/007851, filed on Dec. 22, 2010, in the Receiving Office of the European Patent Office, the entire contents of which are incorporated herein by reference.

The present invention relates to a jointing assembly for electrical cables, in particular for medium or high voltage electrical cables.

Throughout the present description and the attached claims, the term "jointing assembly" is used to indicate either a joint, that is a jointing assembly specifically provided for mechanically and electrically connecting two electrical cables, or a termination, that is a jointing assembly specifically provided for mechanically and electrically connecting an electrical cable to a different device, such as for example an electrical power source, a transformer, a user device etc.

In the present description, the term "medium voltage" is used to refer to a tension typically from about 1 kV to about 30 kV, while the term "high voltage" refers to a tension above 30 kV. The term "very high voltage" is used to define a voltage greater than about 150 kV or 220 kV, up to 500 kV or more.

Different kinds of jointing assemblies for medium or high voltage electrical cables are known. In these jointing assemblies a radially shrinkable sleeves is commonly used for enclosing the connected end portions of two electrical cables (in the case of a joint) or the end portion of an electrical cable connected to a different device (in the case of a termination).

EP 0 435 569 discloses a shrinkable sleeve comprising a dielectric material as an intermediate insulating layer, an electric field control inner layer combined with a partially coated inner conductive layer, and an electrically conducting outer layer.

When making cable splices or cable end terminations by means of a known radially shrinkable sleeve, it is generally provided a free space (usually called "parking position") on one side of the cable, such a free space having a length corresponding to at least the complete length of the shrinkable sleeve.

After the cable connection is established, the shrinkable sleeve is centered over the cable connection area and is then shrunk down either by the application of heat or by the removal of an external or internal support element provided for maintaining the shrinkable sleeve in a radially extended state.

Other known jointing assemblies provide for the use of plug-in connectors.

U.S. Pat. No. 5,316,492 discloses a plug-in connection, in particular in a sleeve for high-voltage plastic cables. The plug-in connection comprises an electrical insulator fitting closely onto cable ends. The cable conductor connecting elements comprise one plug part and one counter-plug part and means for mutually locking the plug part and the counter-plug part.

WO 2007/130811 discloses a tubular terminal for a cable comprising a first connector having opposite terminal ends for connecting to respective mating second and third connectors, each one adapted in turn to be connected to a respective cable for making electrical contact therewith. The tubular terminal comprises a shrinkable sleeve. A portion of said shrinkable sleeve is fixedly arranged around the connector. The shrinkable sleeve is held in a radially expanded state by two support elements which are adapted to be removed thus causing the shrinkable sleeve to shrink onto the first connector and each of the cable ends connected thereto.

The Applicant observed that known jointing assemblies have many drawbacks. In particular the Applicant observed that, in order to achieve a proper electrical and mechanical connection between the connector provided within the shrinkable sleeve and the cable ends, great attention must be paid, in the design stage of the shrinkable sleeve and when associating the shrinkable sleeve with the electrical cables, to the axial position of the first connector within the shrinkable sleeve. In particular, the desired axial position of the first connector, which is determined at the design stage of the shrinkable sleeve, must be maintained when associating the shrinkable sleeve with the electrical cables and up to the end of the junction operation.

For example, the Applicant noted that, due to the fact that the first connector of WO 2007/130811 is fixedly associated with the shrinkable sleeve and because of the different elastic properties of the shrinkable sleeve (which has elastic properties) and the first connector, undesired axial movements of the first connector can occur when the shrinkable sleeve is associated to the electrical cables and, more particularly, when the shrinkable sleeve is shrunk onto the first connector and each of the cable ends connected thereto.

The Applicant faced the technical problem of providing a jointing assembly for electrical cables, in particular for medium or high voltage electrical cables, which is suitable to ensure the desired axial position of a connector provided within a shrinkable sleeve to be maintained when associating the jointing assembly with the electrical cables, particularly when a plug-in connector is used.

The Applicant found that this problem can be solved by mechanically coupling a connector provided within a shrinkable sleeve to the removable support elements provided to hold the shrinkable sleeve in the radially expanded state.

In particular, the Applicant found that the above technical problem can be solved by mechanically coupling the connector to at least one of the removable support elements by means of at least one stop element which projects from at least one of the connector and the support element and contacts the other one of the connector and the support element so as to prevent an axial movement of said connector with respect to said at least one removable support element.

The Applicant observed that, due to the fact that the connector is mechanically coupled to the removable support element, the axial position of the connector is not altered by the elastic behaviour of the shrinkable sleeve when this shrinks onto the connector, so that the desired axial position can be maintained during the jointing operation.

Accordingly, the present invention relates to a jointing assembly for electrical cables, comprising:
 a connector extending about a longitudinal axis and provided, at at least one end portion thereof, with at least one housing seat for at least one free end of a respective electrical cable;
 a shrinkable sleeve coaxially arranged in a radially outer position with respect to said connector;
wherein said shrinkable sleeve is held in a radially expanded state by at least one removable support element radially interposed between said connector and said shrinkable sleeve;
wherein said connector is mechanically coupled to said at least one removable support element by at least one stop element which projects from at least one of said connector and said at least one removable support element and contacts the other one of said connector and said at least one removable support element.

An axial movement of said connector with respect to said at least one removable support element is thus prevented.

Throughout the present description and in the following claims, the terms "radial" and "axial" (or "longitudinal") are used to indicate a perpendicular direction and a parallel direction, respectively, to a reference longitudinal axis of the jointing assembly, the above reference longitudinal axis being defined by the longitudinal axis of the connector. The expression "radially inner/outer" is instead used by referring to the position along a radial direction with respect to the abovementioned longitudinal axis, while the expression "axially inner/outer" is used by referring to the position along a parallel direction to the aforementioned longitudinal axis and with respect to a reference plane perpendicular to said longitudinal axis and intersecting said connector in a central portion thereof.

The jointing assembly of the present invention can comprise at least one of the following preferred features.

Preferably, said at least one removable support element is defined by a tubular body.

More preferably, said tubular body comprises a frusto-conical portion.

Still more preferably, said tubular body comprises two half shells having frusto-conical portions.

In an embodiment of the jointing assembly, said tubular body further comprises a cylindrical end portion.

Said connector can be mechanically coupled to said frusto-conical portion or to said cylindrical end portion.

In an embodiment, said at least one stop element is made in a single piece with said at least one removable support element or said connector.

In an alternative embodiment of the jointing assembly, said at least one stop element is made as a separate piece from said at least one removable support element or said connector.

Said at least one stop element can be firmly associated with said at least one removable support element or said connector, or can be pivotally mounted on said at least one removable support element or said connector, so as to define a first operative configuration wherein said at least one stop element contacts the other of said at least one removable support element and said connector, and a second operative configuration wherein said at least one stop element does not contact the other of said at least one removable support element and said connector.

In a preferred embodiment thereof, the jointing assembly comprises at least two stop elements.

Preferably, said at least two stop elements are symmetrically arranged with respect to said longitudinal axis.

In a preferred embodiment of the jointing assembly, said connector comprises:
  two axially opposite end portions, each of said two end portions being provided with a respective housing seat for a respective free end of a respective electrical cable, and
  two axially opposite removable support elements, each of said two removable support elements being radially interposed between a respective one of said end portions and said shrinkable sleeve.

Preferably, said two removable support elements are symmetrically arranged with respect to said connector.

Further features and advantages of the jointing assembly will appear more clearly from the following detailed description of some preferred embodiments thereof, such description being provided merely by way of non-limiting example and being made with reference to the annexed drawings. In such drawings:

FIG. 7 is a schematic sectional view of a portion of a further different embodiment of a jointing assembly according to the present invention;

FIG. 9a is a schematic sectional view of a further different embodiment of a jointing assembly according to the present invention in a first operative configuration;

FIG. 9b is a schematic sectional view of the jointing assembly of FIG. 9a in a second operative configuration.

Figure 1:
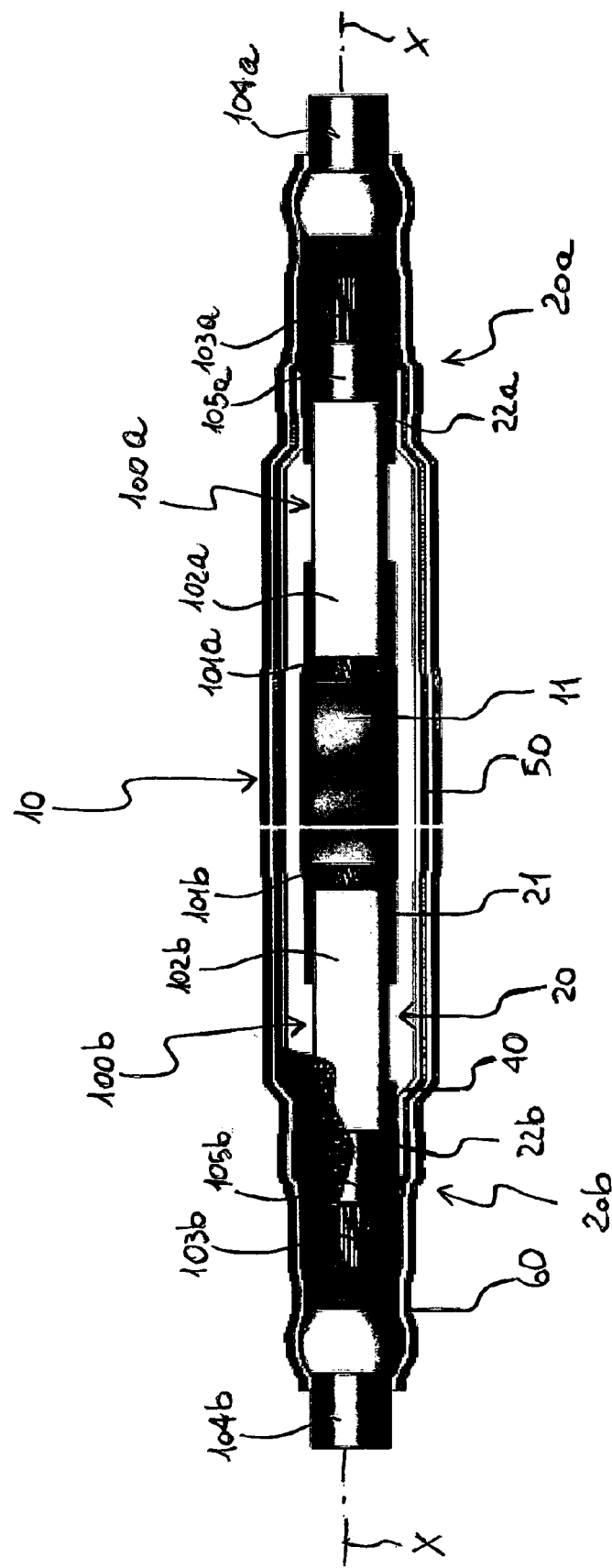
FIG. 1 is a schematic, partially sectioned, view of a jointing assembly according to the present invention in an operative configuration wherein it mechanically and electrically connects two electrical cables.

With respect to FIG. 1, a jointing assembly for electrical cables according to the present invention is indicated with numeral reference 10. In particular, the jointing assembly of FIG. 1 is a joint which is shown in an operative configuration wherein it mechanically and electrically connects two medium or high voltage electrical cables 100a, 100b.

Each electrical cable 100a, 100b comprises at least one conductor 101a, 101b and an insulating layer 102a, 102b coaxially applied at a radially outer position to the at least one conductor 101a, 101b. A conductive screen 103a, 103b is coaxially applied at a radially outer position to the insulating layer 102a, 102b. The conductive screen 103a, 103b is in turn covered with at least one protective sheath 104a, 104b of electrically insulating plastic or elastomeric material.

As shown in FIG. 1, preferably each electrical cable 100a, 100b further comprises at least one semi-conductive sheath 105a, 105b radially interposed between the insulating layer 102a, 102b and the conductive screen 103a, 103b.

In order to expose the conductors 101a, 101b, the end portion of each cable 100a, 100b is treated in such a manner that the conductors 101a, 101b axially project by a predetermined amount with respect to the respective outer layers, as clearly shown in FIG. 1.

Figure 2:
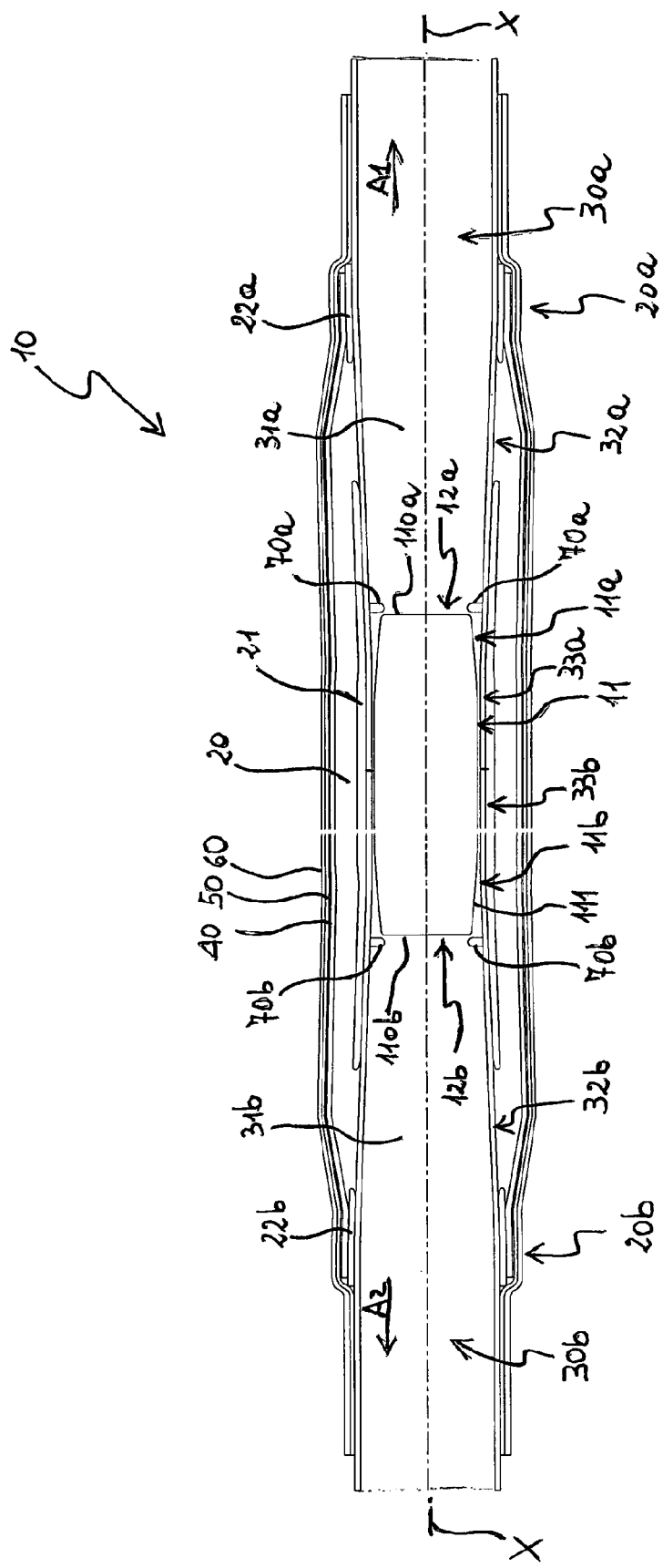
FIG. 2 is a schematic sectional view of a first embodiment of a jointing assembly according to the present invention.

As better shown in FIG. 2, the jointing assembly 10 comprises a connector 11, suitable for plug-in mounting, extending about a longitudinal axis X-X.

The connector 11 is a socket connector, which comprises axially opposite end portions 11a, 11b each provided with a seat 12a, 12b adapted to house and lock into a desired axial position a respective plug (not shown) associated with a respective electrical cable 100a, 100b.

The plug comprises a seat adapted to receive and hold the end portion of the electrical cable 100, 100b by means of clamping, crimping, screws or welding.

After each of the plugs associated with the end portions of the electrical cables 100, 100b is inserted into the respective seat 12a, 12b, this plug is mechanically coupled to the connector 11 in a conventional manner (for example, as disclosed in U.S. Pat. No. 5,316,492), thus providing an electrical connection between the two electrical cables 100a, 100b.

The connector 11 is made of a metallic material, preferably tinned aluminium. It comprises two opposite axially outer surfaces 110a, 110b and a radial tubular surface 111 having a cylindrical central portion and two axially opposite conical portions.

The jointing assembly 10 comprises, in a radially outer position with respect to the connector 11, a radially shrinkable sleeve 20. The sleeve 20 can be made from heat or cold shrinkable dielectric materials. These dielectric materials are generally known by the man skilled in the art. Preferably, the sleeve 20 is made of a cold shrinkable dielectric material, such as rubber EPDM.

The sleeve 20 extends coaxially to the longitudinal axis X-X and has a length greater than that of the connector 11. The connector 11 is centrally arranged within the sleeve 20 along the longitudinal axis X-X so as to have a symmetrical arrangement of the sleeve 20 about the connector 11 along the longitudinal axis X-X.

The sleeve 20 comprises, at a radially inner portion thereof, a first cylindrical insert 21 made of a conductive or semi-conductive material. Throughout the following description, the insert 21 will be indicated as "electrode".

Preferably, the electrode 21 is made of a semi-conductive material. More preferably, such a material is rubber EPDM.

The electrode 21 extends coaxially to the longitudinal axis X-X and has a length greater than that of the connector 11 and lower than that of the sleeve 20. The electrode 21 is symmetrically arranged with respect the connector 11 and the sleeve 20 along the longitudinal axis X-X.

The sleeve 20 further comprises, at each of the end portions 20a, 20b thereof, a respective second cylindrical insert 22a, 22b, made of a conductive or semi-conductive material. Throughout the following description, the inserts 22a, 22b will be indicated as "deflectors".

The deflectors 22a, 22b cooperate with the electrode 21 to control the electrical field within jointing assembly 10, in particular to avoid the presence of areas with high concentration of electrical field, wherein undesired electrical discharges and breakdowns could occur.

Preferably, the deflectors 22a, 22b are made of semi-conductive material. More preferably such a material is rubber EPDM. Alternatively, the deflectors 22a, 22b are made from a material with high permittivity.

Each of the deflectors 22a, 22b extends coaxially to the longitudinal axis X-X and axially projects inside the sleeve 20 toward the electrode 21 so that the radially inner portion of the sleeve 20 is defined, moving from the central portion toward each of the end portions 20a, 20b thereof, by the electrode 21, the dielectric material of the sleeve 20 and the deflector 22a, 22b.

In the jointing assembly of FIG. 1 the electrode 21 and the deflectors 22a, 22b are thus incorporated into the dielectric material of the sleeve 20.

In an alternative embodiment (not shown), the electrode and the deflectors are not incorporated into the dielectric material of the sleeve 20, but are arranged in a radially inner position with respect to the radially inner surface of the sleeve 20.

As shown in FIG. 2, the sleeve 20, together with the electrode 21 and the deflectors 22a, 22b, is held in a radially expanded state by two support elements 30a, 30b which are radially interposed between the connector 11 and the sleeve 20 and symmetrically arranged along the longitudinal axis X-X with respect to the connector 11. In this configuration, the support elements 30a, 30b are associated with each other by a connecting element (not shown) which held the support elements 30a, 30b within the sleeve 20.

Each support element 30a, 30b has a length greater than half of the length of the connector 11 so that when the support elements 30a, 30b are properly arranged within the sleeve 20 and are in contact with each other, the sum of the lengths of the two support elements 30a, 30b is greater than that of the sleeve 20.

After having mechanically and electrically coupled the two electrical cables to the connector 11, the support elements 30a, 30b are axially removed from the opposite end portions 20a, 20b of the sleeve 20 along opposite directions (see arrows A1 e A2 in FIG. 2), thus causing the sleeve 20, together with the electrode 21 and the deflectors 22a, 22b, to shrink onto the connector 11 and each of the cable end portions connected thereto. In order to remove the support elements 30a, 30b, the aforementioned connecting element is broken.

Figure 3:
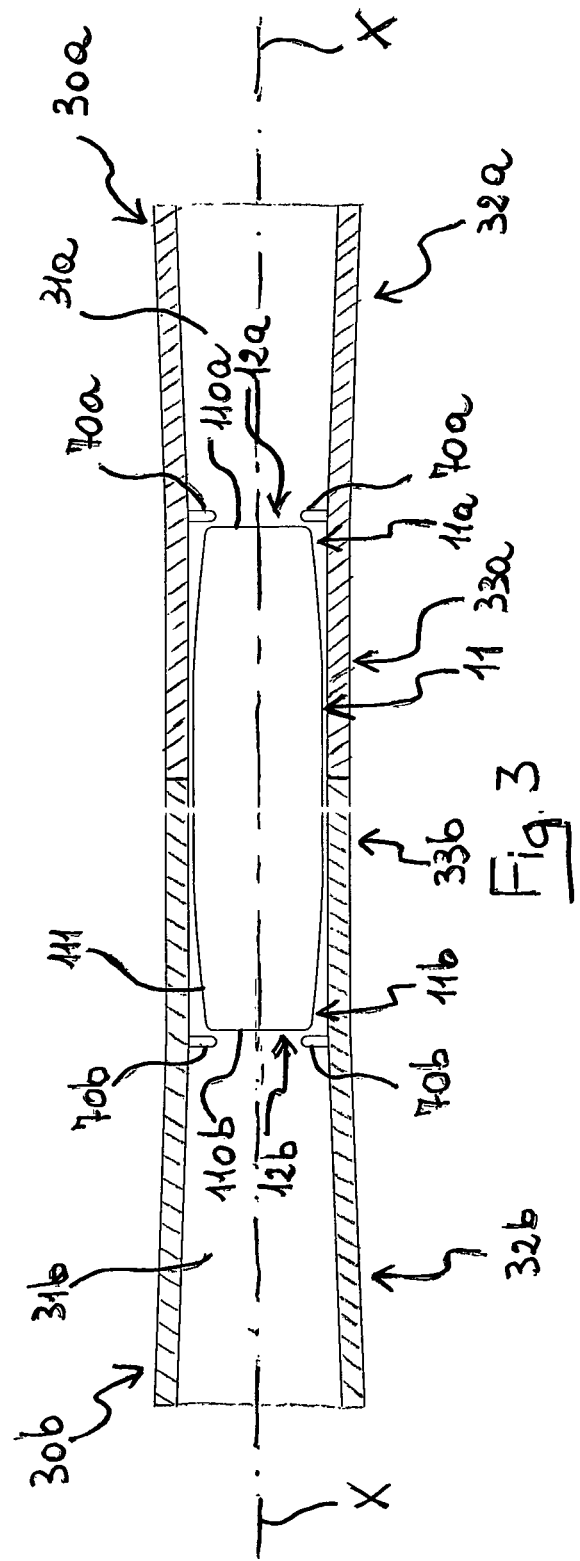
FIG. 3 is a schematic enlarged sectional view of a portion of the jointing assembly of FIG. 2.

As better shown in FIG. 3, each support element 30a, 30b comprises a rigid tubular body 31a, 31b made of a plastic material. Preferably, each of the tubular body 21a, 31b is made of a charged homopolymer polypropylene.

Each tubular body 31a, 31b comprises an axially outer frusto-conical portion 32a, 32b and an axially inner cylindrical end portion 33a, 33b. The tubular body 31a, 31b are thus arranged within the sleeve 20 so that the two axially inner cylindrical end portions 33a, 33b face to one another.

Each tubular body 31a, 31b is preferably formed by two half shells which are associated to each other when the tubular body 31a, 31b is arranged within the sleeve 20 and move away from one another when the tubular body 31a, 31b is out of the sleeve 20.

In an alternative embodiment (not shown) of the jointing assembly of the present invention, each support element is defined by a helically wound strip which is adapted to be removed from the respective end portion of the sleeve by pulling a free end portion of the strip.

The jointing assembly 10 of FIGS. 1 and 2 further comprises, in a radially outer position with respect to the sleeve 20, a first shield 40. The shield 40 has a length substantially equal to that of the sleeve 20.

Preferably, the shield 40 is made of a two-layer sheath including a radially inner layer and a radially outer layer.

The radially inner layer is preferably made of a dielectric material, more preferably rubber EPDM. The radially outer layer is preferably made of a semi-conductive material, more preferably rubber EPDM.

In a radially outer position with respect to the first shield 40, a metallic screen 50 is provided. The screen 50 has a length greater than that of the sleeve 20 and is preferably made of tinned copper.

The jointing assembly 10 further comprises, in a radially outer position with respect to the screen 50, a second shield 60 having preferably a length substantially greater than that of the screen 50.

Preferably, the shield 60 is made of a two-layer sheath, that is it includes a radially inner layer made from a dielectric material and a radially outer layer made from a semi-conductive material. More preferably, the same material of the shield 40 is used.

As shown in FIGS. 2 and 3, the connector 11 is mechanically coupled to each support element 30a, 30b by at least two pairs of stop elements 70a, 70b which are symmetrically arranged on axially opposite sides with respect to the connector 11.

In the following of the present description reference will be made to only one of the aforementioned support elements (in particular, the support element 30a) and to the respective stop elements (in particular, the stop elements 70a). However, the following description will identically apply to the other one of the aforementioned support elements (the support element 31b) and the respective stop elements (the stop elements 70b), unless when expressly stated the contrary.

At least two stop elements 70a are arranged equidistant from one another at a predetermined axial distance from the free end of the tubular element 31a.

Each of the stop elements 70a projects from the radially inner surface of the support element 30a along a direction substantially perpendicular to the longitudinal axis X-X. In particular, the top elements 70a radially project from the frusto-conical portion 32a of the support element 30a toward the longitudinal axis X-X.

The stop elements 70a are in abutment against the axially outer surface 110a of the connector 11 so as to prevent any movement of the connector 11 along the axially outer free end portion of the support element 30a. Since, the stop elements 70b are similarly in abutment against the opposite axially outer surface 110b of the connector 11 so as to prevent any movement of the connector 11 along the opposite axially outer free end portion of the support element 30b, it follows that the stop elements 70a and 70b prevent any axial movement of the connector 11 along both way of a direction parallel to the longitudinal axis X-X.

Figure 8D:
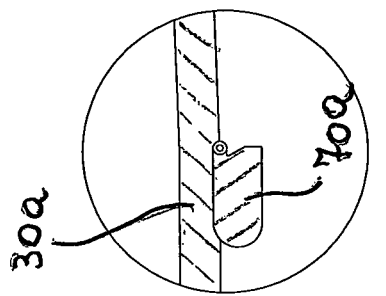
FIGS. 8a-8d are enlarged views of different embodiments of a detail of a jointing assembly according to the present invention.
Figure 8C:
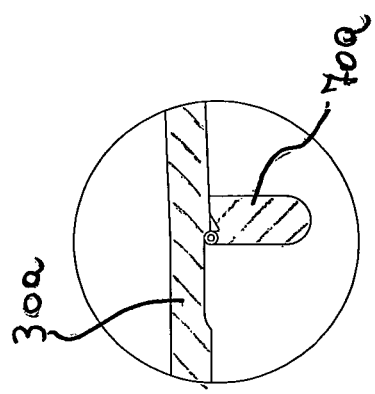
Figure 8B:
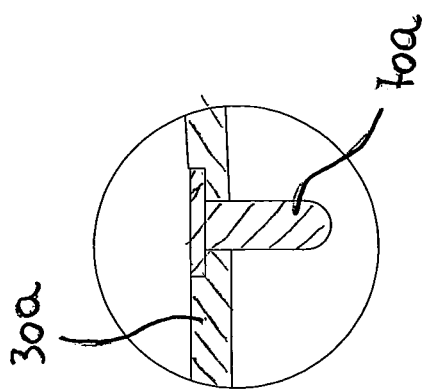
Figure 8A:
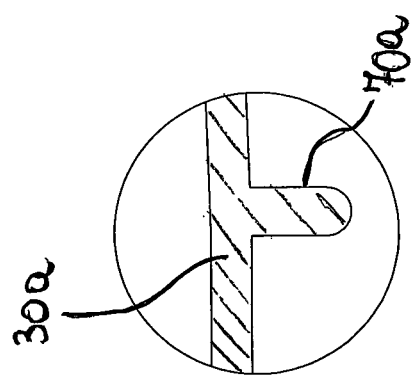

Each of the stop elements 70a can be made in a single piece with the support element 30a by moulding, as shown in the detail of FIG. 8a.

Alternatively, each of the stop elements 70a can be made as a separate piece from the support element 30a, as shown in the detail of FIG. 8b. In this case, the stop element can be firmly associated with the support element 30a by cold or hot welding or alternatively by mechanical or chemical coupling.

Alternatively, each of the stop elements 70a can be pivotally mounted on the support element 30a so as to define a first operative configuration wherein the stop elements 70a are in a first position (FIG. 8c) such that they contact the connector 11 thus preventing any axial movement thereof, and a second operative configuration wherein the stop elements 70a are in a second position (FIG. 8d) such that they do not contact the connector 11 thus making the support element 30a free to move axially with respect to the connector 11.

Each stop element 70a has preferably a circular transversal section and a rounded free end portion.

In an alternative embodiment not shown, each pair of stop elements 70a, 70b is replaced by a single stop element projecting from the radially inner surface of the support element 30a and circumferentially extending about the longitudinal axis X-X.

Figure 4:
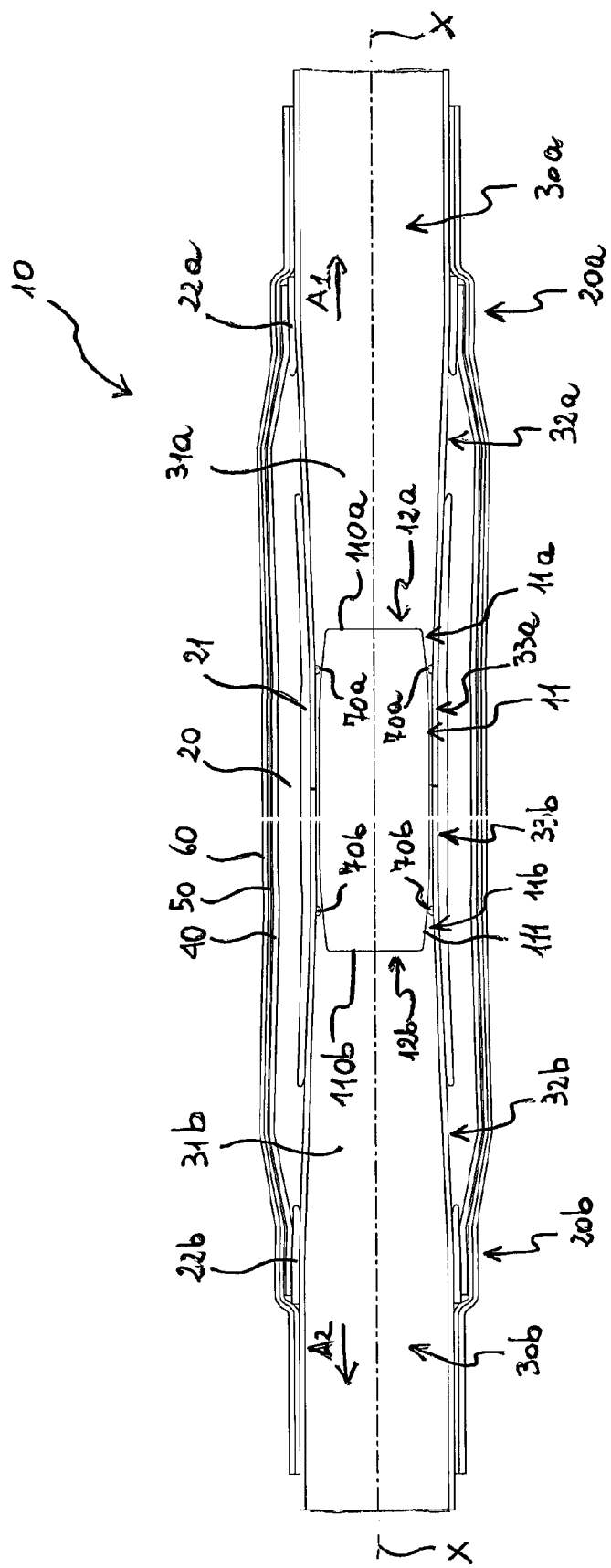
FIG. 4 is a schematic sectional view of a second embodiment of a jointing assembly according to the present invention.

A different embodiment of the jointing assembly 10 of the present invention is shown in FIG. 4. In this figure, structural elements which are identical or functionally equivalent to those described above with respect to FIGS. 1-3 are indicated with the same numeral references and will not be further described.

The embodiment of FIG. 4 differs from the embodiment of FIGS. 2 and 3 in that the stop elements 70a are shorter than those of the embodiment of FIGS. 2 and 3 and in that they abut against the conical portion of the radially outer surface 111 of the connector 11. Similar considerations apply to the stop elements 70b.

Figure 5:
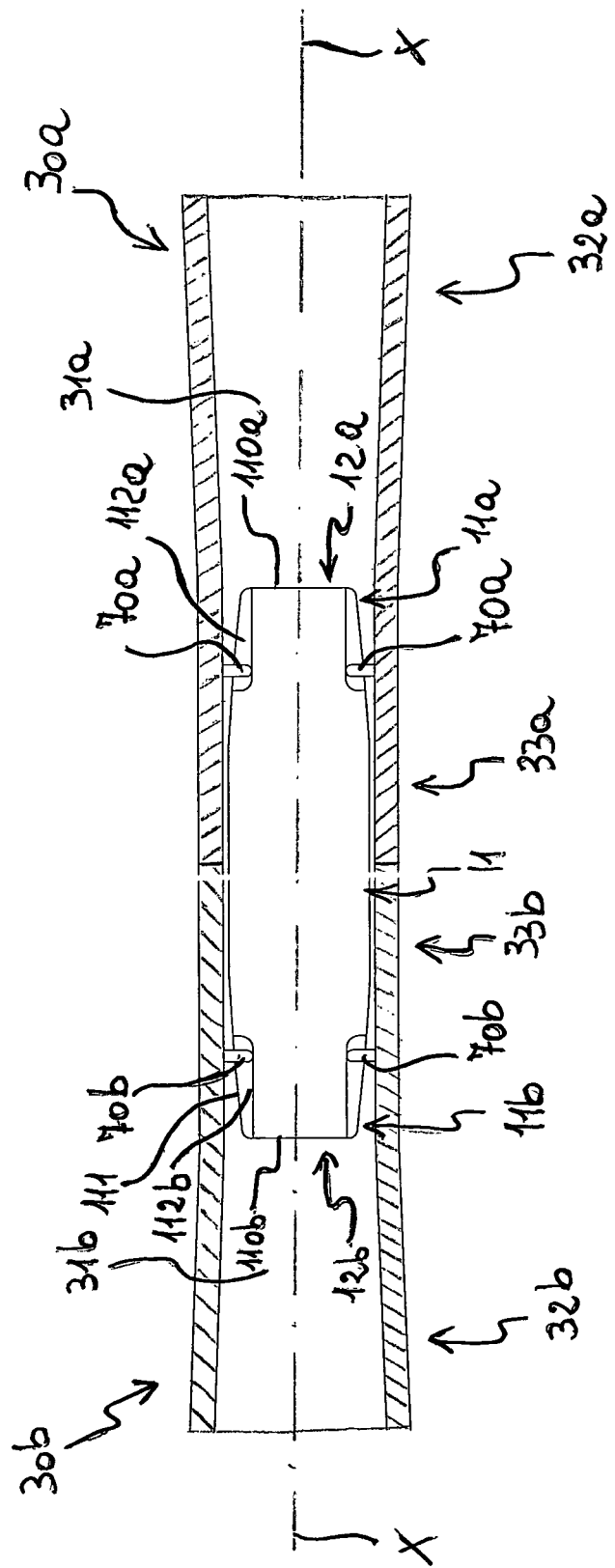
FIG. 5 is a schematic sectional view of a portion of a different embodiment of a jointing assembly according to the present invention.

A portion of a further different embodiment of the jointing assembly 10 of the present invention is shown in FIG. 5. In this figure, structural elements which are identical, or functionally equivalent, to those described above with respect to FIGS. 1-4 are indicated with the same numeral references and will not be further described.

The embodiment of FIG. 5 differs from the embodiment of FIGS. 2 and 3 in that the stop elements 70a, 70b are housed into respective seats 112a, 112b which are circumferentially formed in the conical portion of the radially outer surface 111 of the connector 11 and in that the stop elements 70a, 70b project from the cylindrical end portions 33a, 33b of the support elements 30a, 30b.

Figure 6:
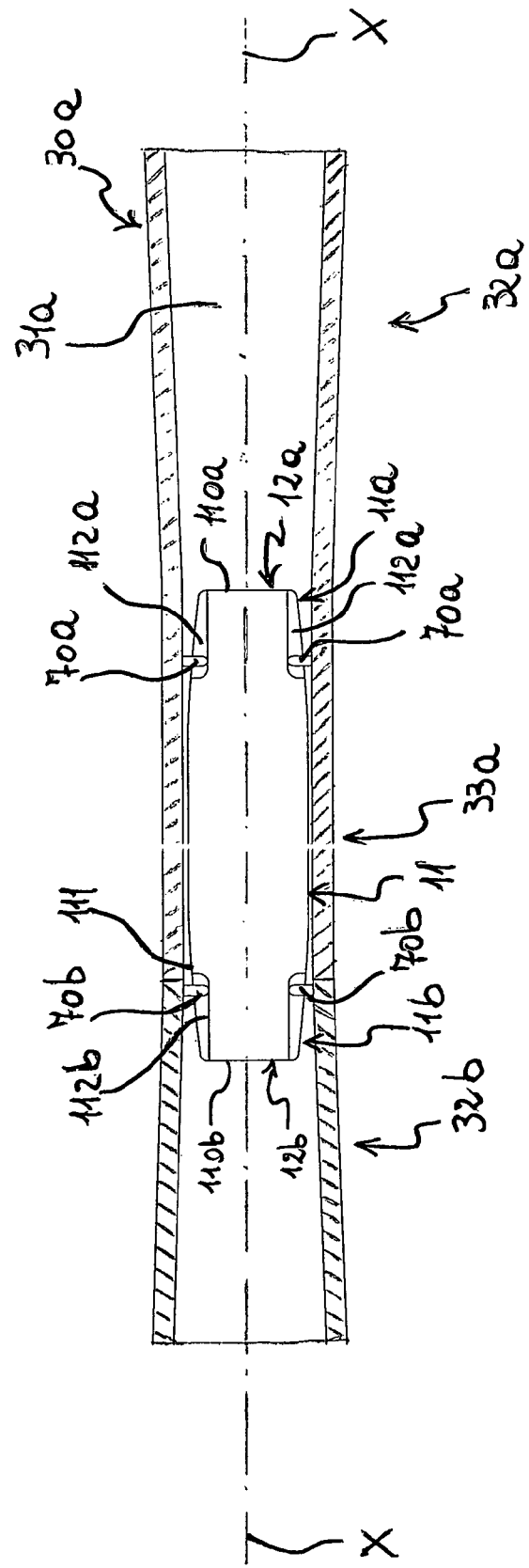
FIG. 6 is a schematic sectional view of a portion of a further different embodiment of a jointing assembly according to the present invention.

A portion of a further different embodiment of the jointing assembly 10 of the present invention is shown in FIG. 6. In this figure, structural elements which are identical, or functionally equivalent, to those described above with respect to FIGS. 1-5 are indicated with the same numeral references and will not be further described.

The embodiment of FIG. 6 differs from the embodiment of FIG. 5 in that the support elements 30a, 30b, being not identical to each other, are not symmetrically arranged with respect to the connector 1.

In particular, the support element 30a comprises an axially outer frusto-conical portion 32a and an axially inner cylindrical end portion 33a, while the support element 30b comprises just a frusto-conical portion 32b. The stop elements 70 are arranged on the cylindrical end portion 33a of the support element 30a while the stop elements 70b are arranged on the axially inner end portion of the frusto-conical portion 32b of the support element 30b.

A portion of a further different embodiment of the jointing assembly 10 of the present invention is shown in FIG. 7. In this figure, structural elements which are identical, or functionally equivalent, to those described above with respect to FIGS. 1-6 are indicated with the same numeral references and will not be further described.

The embodiment of FIG. 7 differs from the embodiment of FIG. 6 in that the stop elements 70a are arranged on the frusto-conical portion 32a and in that the stop elements 70a, 70b abut against the axially outer surfaces 110a, 110b of the connector 11, as in the embodiment of FIGS. 2 and 3.

A portion of a further different embodiment of the jointing assembly 10 of the present invention is shown in FIGS. 9a and 9b. In these figures, structural elements which are identical, or functionally equivalent, to those described above with respect to FIGS. 1-8 are indicated with the same numeral references and will not be further described.

The embodiment of FIGS. 9a and 8b differs from the embodiment of FIGS. 2 and 3 in that the stop elements 70a, 70b are pivotally mounted—in the same way as shown in FIGS. 8c and 8d—on the radially outer surface 111 of the connector 11 and are adapted to be housed into circumferential seats 300a, 300b formed in the radially inner surface of the support elements 30a, 30b, respectively.

In particular, as shown in FIG. 9a, when the support elements 30a, 30b are arranged in frontal contact to each other (that is when the support elements 30a, 30b are within the sleeve 20 to hold the sleeve in the radially expanded state), the stop elements 70a, 70b are in a first operative position wherein they radially project from the radially outer surface 111 of the connector 11 (in particular from the cylindrical central portion thereof) and axially abut against respective abutment surfaces 301a, 301b formed in the seats 300a, 300b, respectively, thus defining a first operative configuration wherein the connector 11 is prevented to axially move with respect to the support elements 30a, 30b.

Differently, as shown in FIG. 9b, when the support elements 30a, 30b are moved away from one another to be removed from the sleeve 20 (see arrows A1 and A2), the stop elements 70a, 70b are in a second operative position wherein they lay on the radially outer surface 111 of the connector 11 and are out of the seats 300a, 300b, thus defining a second operative configuration wherein the support elements 30*a*, 30*b* are free to move axially with respect to the connector 11.

Advantageously, in all the above described embodiments the connector 11 is mechanically coupled to the support elements 30*a*, 30*b* up to when the support elements 30*a*, 30*b* are moved out from the jointing assembly 10 to cause the sleeve 20 to shrink onto the connector 11 and the end portion of the electrical cables attached thereto. Therefore, when the sleeve 20 starts to shrink no undesired stress is exerted on the connector 11 as at that time there is no contact between sleeve 20 and connector 11 yet. Thus, the desired axial position of the connector 11 within the jointing assembly 10 is not altered by the shrinking action of the sleeve 20 at the beginning of the shrinking. Upon contacting the connector 11 during shrinking, the sleeve 20 exerts on the connector 11 a radial force which locks into position the connector 11, so that the desired axial position of the connector 11 is not altered up to the end of the shrinking action.

In addition thereof, the provision of the stop elements 70*a*, 70*b* makes easier the positioning of the connector 11 at the desired axial position within the jointing assembly 10 when assembling the jointing assembly 10. Indeed, once the stop elements 70*a*, 70*b* are arranged on one of the connector 11 and support elements 30*a*, 30*b* at the desired axial position from the free end thereof, the connector 11 can be axially inserted into the support element 30*a*, 30*b* and moved up to when the stop elements 70*a*, 70*b* contact the abutment surface on the other element between connector 11 and tubular elements 30*a*, 300*b*.

The skilled person will understand that, starting from the above described different embodiments of the jointing assembly of the present invention, a plurality of further different embodiments can be foreseen by combining in different ways the various features described above. All these embodiments are indeed encompassed by the present invention and are within the scope of protection defined by the attached claims.

While the above description has been made referring to a jointing assembly for connecting two electrical cables, that is a joint, the description also applies in the case of a jointing assembly for connecting an electrical cable to a different device (such as for example an electrical power source, a transformer, a user device), that is a termination, in those cases where such a termination comprises features analogous to those herewith described and/or claimed. Therefore, both a joint and a termination are encompassed by the present invention and are within the scope of protection defined by the attached claims.

The invention claimed is:

1. A jointing assembly for electrical cables, the jointing assembly comprising:
    a connector extending about a longitudinal axis and provided, at at least one end portion thereof, with at least one housing seat for at least one free end of a respective electrical cable; and
    a shrinkable sleeve coaxially arranged in a radially outer position with respect to the connector;
    wherein the shrinkable sleeve is held in a radially expanded state by at least one removable support element radially interposed between the connector and the shrinkable sleeve, and
    wherein the connector is mechanically coupled to the at least one removable support element by at least one stop element that radially projects from at least one of the connector and the at least one removable support element, and that contacts the other one of the connector and the at least one removable support element.

2. The jointing assembly of claim 1, wherein said the at least one removable support element is defined by a tubular body.

3. The jointing assembly of claim 2, wherein the tubular body comprises a frusto-conical portion.

4. The jointing assembly of claim 3, wherein the tubular body further comprises a cylindrical end portion.

5. The jointing assembly of claim 4, wherein the connector is mechanically coupled to the cylindrical end portion.

6. The jointing assembly of claim 4, wherein the connector is mechanically coupled to the frusto-conical portion.

7. The jointing assembly of claim 3, wherein the connector is mechanically coupled to the frusto-conical portion.

8. The jointing assembly of claim 1, wherein the at least one stop element is made in a single piece with the at least one removable support element or the connector.

9. The jointing assembly of claim 8, wherein the at least one stop element is made as a separate piece from the at least one removable support element or the connector.

10. The jointing assembly of claim 9, wherein the at least one stop element is firmly associated with the at least one removable support element or the connector.

11. The jointing assembly of claim 9, wherein the at least one stop element is pivotally mounted on the at least one removable support element or the connector so as to define:
    a first operative configuration wherein the at least one stop element contacts the other of the at least one removable support element and the connector; and
    a second operative configuration wherein the at least one stop element does not contact the other of the at least one removable support element and the connector.

12. The jointing assembly of claim 1, wherein the at least one stop element comprises at least two stop elements.

13. The jointing assembly of claim 12, wherein the at least two stop elements are symmetrically arranged with respect to the longitudinal axis.

14. The jointing assembly of claim 1, wherein the connector comprises two axially opposite end portions, each of the two end portions being provided with a respective housing seat for a respective free end of a respective electrical cable, and
    wherein the at least one removable support element comprises two axially opposite removable support elements, each of the two removable support elements being radially interposed between a respective one of the end portions of the connector and the shrinkable sleeve.

15. The jointing assembly of claim 14, wherein the two removable support elements are symmetrically arranged with respect to the connector.

16. The jointing assembly of claim 1, wherein the at least one stop element is made as a separate piece from said at least one removable support element or the connector.

17. The jointing assembly of claim 16, wherein the at least one stop element is firmly associated with the at least one removable support element or the connector.

18. The jointing assembly of claim 16, wherein the at least one stop element is pivotally mounted on the at least one removable support element or said connector so as to define:
    a first operative configuration wherein the at least one stop element contacts the other of the at least one removable support element and the connector; and
    a second operative configuration wherein the at least one stop element does not contact the other of the at least one removable support element and the connector.

* * * * *